(12) United States Patent  
Suzuki et al.

(10) Patent No.: US 10,975,849 B2  
(45) Date of Patent: Apr. 13, 2021

(54) CONDITION MONITORING SYSTEM AND WIND TURBINE INCLUDING THE SAME

(71) Applicant: NTN CORPORATION, Osaka (JP)

(72) Inventors: Yosuke Suzuki, Kuwana (JP); Toru Takahashi, Kuwana (JP)

(73) Assignee: NTN CORPORATION, Osaka (JP)

( * ) Notice: Subject to any disclaimer, the term of this patent is extended or adjusted under 35 U.S.C. 154(b) by 248 days.

(21) Appl. No.: 16/087,508

(22) PCT Filed: Mar. 15, 2017

(86) PCT No.: PCT/JP2017/010398  
§ 371 (c)(1),  
(2) Date: Sep. 21, 2018

(87) PCT Pub. No.: WO2017/164034  
PCT Pub. Date: Sep. 28, 2017

(65) Prior Publication Data  
US 2019/0101104 A1 Apr. 4, 2019

(30) Foreign Application Priority Data  
Mar. 23, 2016 (JP) .............................. JP2016-058148

(51) Int. Cl.  
*F03D 17/00* (2016.01)  
*G01H 1/00* (2006.01)  
(Continued)

(52) U.S. Cl.  
CPC .............. *F03D 17/00* (2016.05); *G01H 1/003* (2013.01); *G01H 17/00* (2013.01);  
(Continued)

(58) Field of Classification Search  
CPC ......... F03D 17/00; F03D 80/70; G01H 1/003; G01H 13/00; G01H 17/00; G01M 13/045; G01M 13/021; G01M 13/028  
(Continued)

(56) References Cited

U.S. PATENT DOCUMENTS 6,158,286 A 12/2000 Nguyen et al.  
2008/0033695 A1 2/2008 Sahara et al.  
(Continued)

FOREIGN PATENT DOCUMENTS

CN 103185670 A 7/2013  
JP 54-37178 U 3/1979  
(Continued)

OTHER PUBLICATIONS

International Search Report issued in corresponding International Patent Application No. PCT/JP2017/010398, dated Jun. 20, 2017, with English Translation.  
(Continued)

*Primary Examiner* — Lisa M Caputo  
*Assistant Examiner* — Rose M Miller  
(74) *Attorney, Agent, or Firm* — McDermott Will & Emery LLP

(57) ABSTRACT

A first vibration sensor measures vibration of a bearing. A second vibration sensor for measuring background noise received by the first vibration sensor is installed so as not to receive vibration of the bearing. A data acquisition device receives a first signal that is a measurement signal of the first vibration sensor and a second signal that is a measurement signal of the second vibration sensor and outputs a third signal obtained by subtracting the second signal from the first signal as data indicating vibration of the bearing.

10 Claims, 6 Drawing Sheets

(51) Int. Cl.
  *G01H 17/00* (2006.01)
  *G01M 13/045* (2019.01)
  *F03D 80/70* (2016.01)
(52) U.S. Cl.
  CPC ........... *G01M 13/045* (2013.01); *F03D 80/70* (2016.05); *F05B 2260/96* (2013.01); *F05B 2270/334* (2013.01); *F05B 2270/807* (2013.01)
(58) Field of Classification Search
  USPC .................................. 73/593, 579, 587, 660
  See application file for complete search history.

(56) References Cited

U.S. PATENT DOCUMENTS

| | | | |
|---|---|---|---|
| 2009/0162186 A1* | 6/2009 | Christinsen | G01H 1/06 415/1 |
| 2012/0133135 A1* | 5/2012 | Su | F03D 7/0264 290/44 |
| 2012/0321464 A1* | 12/2012 | Andersen | F03D 7/0296 416/1 |
| 2013/0167624 A1 | 7/2013 | Shoda | |
| 2014/0193257 A1* | 7/2014 | Ormel | F03D 7/0296 416/31 |
| 2016/0187226 A1 | 6/2016 | Tsutsui et al. | |

FOREIGN PATENT DOCUMENTS

| | | |
|---|---|---|
| JP | 5-73578 U | 10/1995 |
| JP | 2006-113002 A | 4/2006 |
| JP | 2011-154020 A | 8/2011 |
| JP | 2014-152624 A | 8/2014 |
| JP | 2015-031626 A | 2/2015 |

OTHER PUBLICATIONS

Chinese Office Action issued in corresponding Chinese Application No. 201780018774.9, dated Jan. 6, 2020, with English translation.

* cited by examiner

CONDITION MONITORING SYSTEM AND WIND TURBINE INCLUDING THE SAME

CROSS REFERENCE

This application is the U.S. National Phase under 35 U.S.C. § 371 of International Application No. PCT/JP2017/010398 filed on Mar. 15, 2017, which claims the benefit of Japanese Application No. 2016-058148, filed on Mar. 23, 2016, the entire contents of each are hereby incorporated by reference.

TECHNICAL FIELD

The present invention relates to a condition monitoring system that monitors a state of a wind turbine, and a wind turbine including the same.

BACKGROUND ART

In a wind turbine, a condition monitoring system (CMS) is known which measures vibration of a mechanical component such as bearings of a main shaft and a gearbox with a vibration sensor and monitors a state of the mechanical component.

Such a condition monitoring system is described in, for example, Japanese Patent Laying-Open No. 2011-154020 (PTD 1), which provides an abnormality diagnosing apparatus that diagnoses abnormality of a bearing provided in a wind turbine. In this abnormality diagnosing apparatus, the vibration waveform of the bearing is measured using a vibration sensor. Then, the effective value of the measured vibration waveform is calculated, and an envelope waveform of the vibration waveform is generated by performing an envelope process on the measured vibration waveform. Abnormality of the bearing is diagnosed based on the effective value of the vibration waveform and the effective value of an alternating-current component of the envelope waveform. This abnormality diagnosing apparatus can provide accurate abnormality diagnosis (see PTD 1).

CITATION LIST

Patent Document

PTD 1: Japanese Patent Laying-Open No. 2011-154020

SUMMARY OF INVENTION

Technical Problem

A wind turbine is provided with, for example, an inverter for converting electric power generated by the generator, an electromagnetic contactor switching between supply and cutting-off of power, and a variety of hydraulic pumps, and noise (mainly electromagnetic noise) produced from these devices is superimposed on an output signal of the vibration sensor. In addition, a variety of radio waves changing from hour to hour are also received as noise because the wind turbine is typically installed at a high altitude outside. The vibration data including noise makes it difficult to accurately estimate or predict the state, damage, etc. of the mechanical component as a monitoring target.

Conventionally, a variety of filters (for example, high-pass filter, low-pass filter, band-pass filter) in the form of hardware or software are provided for an output signal of the vibration sensor to attenuate a signal in a certain frequency band including noise components. However, the wind turbine installed at a high altitude outside is susceptible to various kinds of noise, and it is difficult to sufficiently remove noise only with a filter that attenuates a signal in a certain frequency band.

The present invention is made in order to solve such a problem and is aimed to obtain vibration measurement data in which noise is sufficiently reduced, in a condition monitoring system that monitors a state of a wind turbine.

Solution to Problem

The present invention provides a condition monitoring system that monitors a state of a wind turbine. The condition monitoring system includes first and second vibration sensors and a controller. The first vibration sensor is installed at a mechanical component which is a source of noise in the wind turbine and measures vibration of the mechanical component. The second vibration sensor for measuring noise (background noise) received by the first vibration sensor is installed in the wind turbine so as not to receive vibration of the mechanical component. The controller includes a first process of receiving a first signal that is a measurement signal of the first vibration sensor and a second signal that is a measurement signal of the second vibration sensor and outputting a third signal obtained by subtracting the second signal from the first signal as data indicating vibration of the mechanical component.

Preferably, the controller disables the first process when a magnitude of the second signal is equal to or greater than a first predetermined value indicating that the noise is excessive, and executes the first process when the magnitude of the second signal is smaller than the first predetermined value.

Preferably, the controller further includes a second process of outputting the first signal as the data indicating vibration of the mechanical component when a magnitude of the second signal is smaller than a second predetermined value indicating that the noise is minute. The controller executes the first process when the magnitude of the second signal is equal to or greater than the second predetermined value.

Further preferably, the controller disables the first and second processes when the magnitude of the second signal is equal to or greater than a third predetermined value indicating that the noise is excessive.

The present invention provides a wind turbine including any of the condition monitoring system described above.

Advantageous Effects of Invention

In the present invention, a second vibration sensor is provided for measuring noise (background noise) received by a first vibration sensor measuring vibration of a mechanical component. Then, a third signal obtained by subtracting a second signal that is a measurement signal of the second vibration sensor from a first signal that is a measurement signal of the first vibration sensor is output as data indicating vibration of the mechanical component. Vibration measurement data is thus obtained that does not include noise (background noise) received by the first vibration sensor. Therefore, the present invention provides vibration measurement data in which noise is sufficiently reduced in a condition monitoring system that monitors a state of a wind turbine.

DESCRIPTION OF EMBODIMENTS

Embodiments of the present invention will be described below with reference to the figures. In the following description, the same or corresponding parts are denoted by the same reference signs and a detailed description thereof will not be repeated.

First Embodiment

Figure 1:
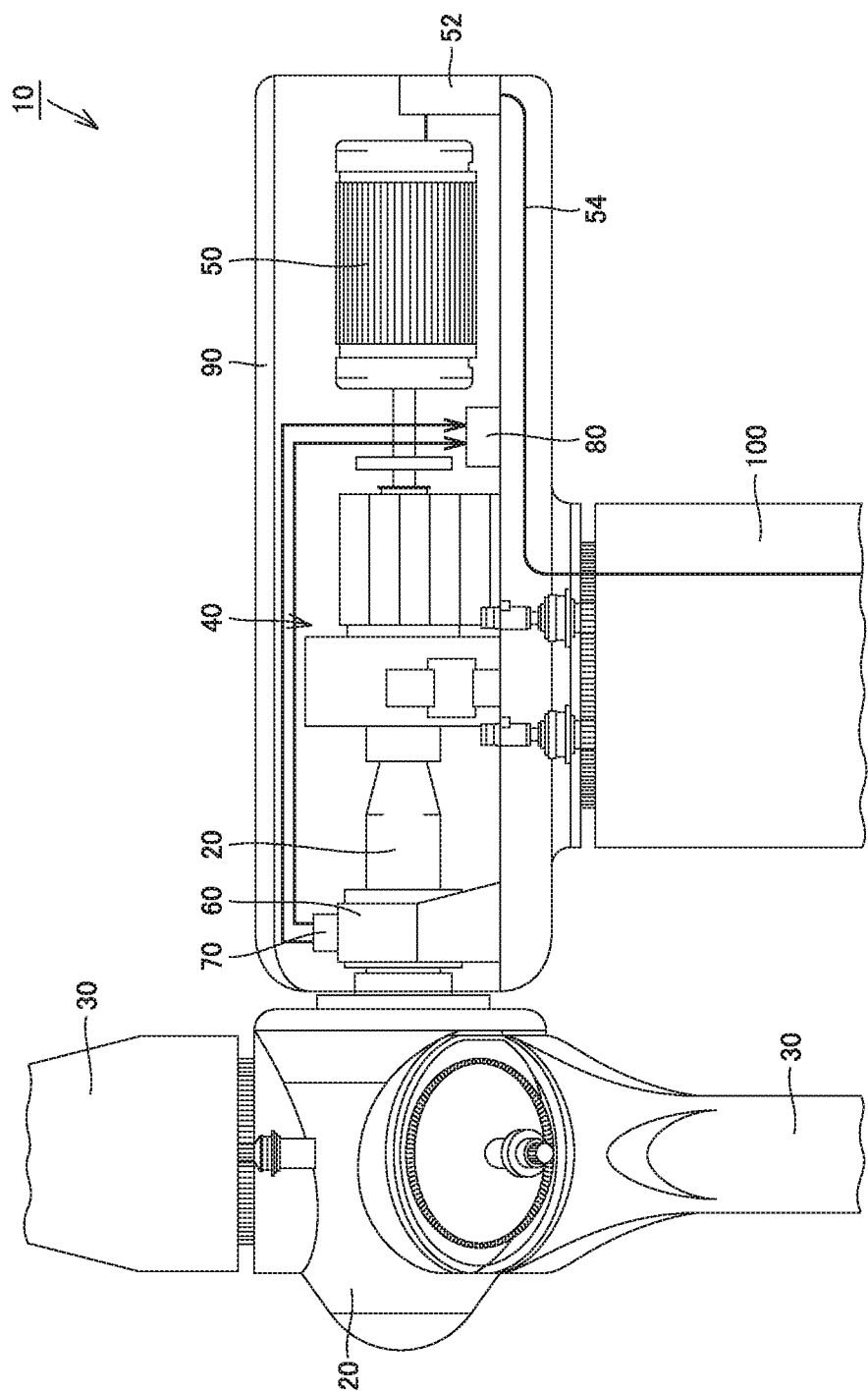
FIG. 1 is a diagram schematically showing a configuration of a wind turbine including a condition monitoring system according to a first embodiment of the present invention.

FIG. 1 is a diagram schematically showing a configuration of a wind turbine including a condition monitoring system according to a first embodiment of the present invention. Referring to FIG. 1, a wind turbine 10 includes a main shaft 20, a blade 30, a gearbox 40, a generator 50, a control board 52, and a power transmission line 54. Wind turbine 10 further includes a main shaft bearing (hereinafter simply referred to as "bearing") 60, a vibration detection unit 70, and a data processor 80. Gearbox 40, generator 50, control board 52, bearing 60, vibration detection unit 70, and data processor 80 are installed in a nacelle 90, and nacelle 90 is supported by a tower 100.

Main shaft 20 extends into nacelle 90 to be connected to the input shaft of gearbox 40 and is rotatably supported by bearing 60. Main shaft 20 then transmits rotational torque generated by blade 30 receiving wind power to the input shaft of gearbox 40. Blade 30 is provided at the tip end of main shaft 20 and converts wind power into rotational torque to be transmitted to main shaft 20.

Bearing 60 is fixed in nacelle 90 and rotatably supports main shaft 20. Bearing 60 is configured with a rolling bearing, for example, configured with a spherical roller bearing, a tapered roller bearing, a cylindrical roller bearing, or a ball bearing. These bearings may be a single row or a double row.

Vibration detection unit 70 is installed at bearing 60. Vibration detection unit 70 detects vibration of bearing 60 with a vibration sensor fixed to bearing 60 and detects background noise received by the vibration sensor and outputs the detection values of vibration of bearing 60 and background noise to data processor 80. A specific configuration of vibration detection unit 70 will be described in detail later.

Gearbox 40 is provided between main shaft 20 and generator 50 to increase the rotational speed of main shaft 20 for output to generator 50. As an example, gearbox 40 is configured with a gear speed-increasing mechanism including a planetary gear train, an intermediate shaft, and a high speed shaft. Generator 50 is connected to the output shaft of gearbox 40 to generate electric power with the rotational torque received from gearbox 40. Generator 50 is configured with, for example, an induction generator.

Control board 52 includes an inverter and an electromagnetic contactor (not shown in the figures). The inverter converts power generated by generator 50 to a voltage and a frequency of a system for output to power transmission line 54 connected to the system. The electromagnetic contactor is connected between the inverter and power transmission line 54 for switching between supply and cutting-off of power output from the inverter. The inverter generates noise (electromagnetic noise) involved with switching operation, and the electromagnetic contactor generates noise (electromagnetic noise) during switching between supply and cutting-off of power. In other words, the inverter and the electromagnetic contactor are sources of noise for the vibration sensor provided in vibration detection unit 70.

Data processor 80 includes a CPU (Central Processing Unit), a ROM (Read Only Memory) storing a processing program and the like, a RAM (Random Access Memory) temporarily storing data, and an input/output port for inputting and outputting a variety of signals (not shown in the figures). Data processor 80 receives detection values of vibration of bearing 60 and background noise from vibration detection unit 70 and executes data processing by a method described below under instructions of a program stored in the ROM. The processing executed by data processor 80 is not limited to processing by software and may be executed by dedicated hardware (electronic circuit).

In this wind turbine 10, vibration of bearing 60 is detected in vibration detection unit 70, and processing for removing noise is executed in data processor 80. The vibration measurement data from which noise is removed is transmitted to an external server (not shown), and the server performs vibration analysis.

Here, for example, the inverter and the electromagnetic contactor included in control board 52 and the not-shown hydraulic pumps (for example, a hydraulic pump for braking of main shaft 20, a hydraulic pump for changing pitch angle of blade 30) are sources of noise (electromagnetic noise sources) for vibration detection unit 70, and noise produced from these devices is superimposed on an output signal of vibration detection unit 70. Wind turbine 10 is installed at a high altitude outside and therefore receives a variety of radio waves changing from hour to hour as noise. When vibration measurement data includes such noise, it is difficult to accurately estimate or predict the state, damage, etc. of bearing 60 as a monitoring target.

Conventionally, a variety of filters (for example, high-pass filter, low-pass filter, band-pass filter) in the form of hardware or software are provided for an output signal of the vibration sensor to attenuate a signal in a certain frequency band including noise components. However, wind turbine 10 installed at a high altitude outside is susceptible to various kinds of noise, and it is difficult to sufficiently remove noise only with a filter that attenuates a signal in a certain frequency band.

Then, in this condition monitoring system according to the first embodiment, vibration detection unit 70 includes a vibration sensor (first vibration sensor) for measuring vibration of bearing 60 and a vibration sensor (second vibration sensor) for measuring background noise received by the first vibration sensor. Then, a third signal obtained by subtracting a second signal that is a measurement signal of the second vibration sensor from a first signal that is a measurement signal of the first vibration sensor is output as data (vibration measurement data) indicating vibration of bearing 60. Thus, vibration measurement data that does not include background noise received by the first vibration sensor can be obtained.

Figure 2:
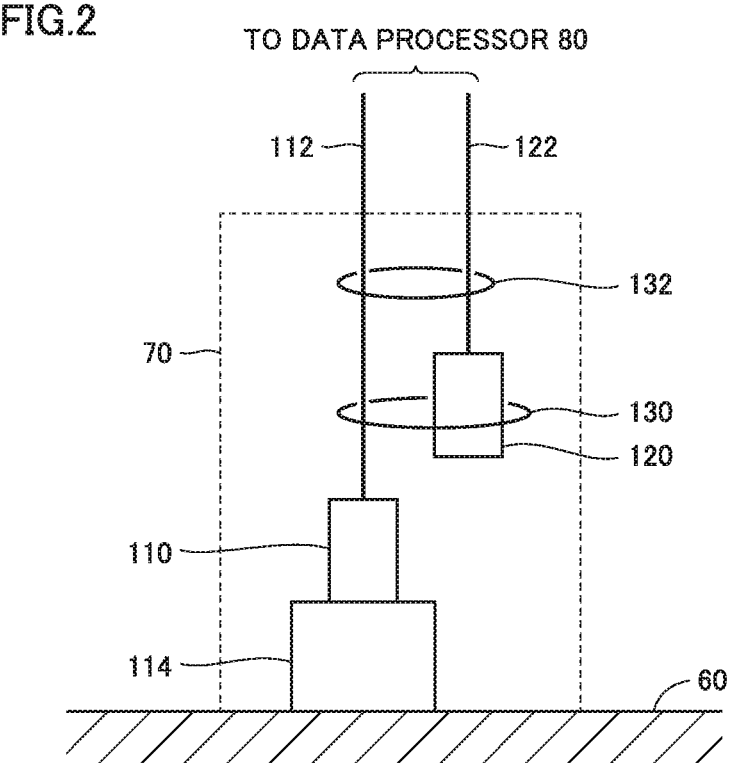
FIG. 2 is a diagram showing a configuration of a vibration detection unit.

FIG. 2 is a diagram showing a configuration of vibration detection unit 70. Referring to FIG. 2, vibration detection unit 70 includes a first vibration sensor 110, a second vibration sensor 120, a metal base 114, and fixing members 130, 132.

First vibration sensor 110 is installed at bearing 60 with metal base 114 interposed. First vibration sensor 110 detects vibration of bearing 60 through metal base 114 and outputs the detection value to data processor 80 through a signal line 112. First vibration sensor 110 is configured with, for example, an acceleration sensor including a piezoelectric element. Metal base 114 provides an installation surface for first vibration sensor 110. Metal base 114 may be omitted when first vibration sensor 110 can be installed firmly in intimate contact with a surface of bearing 60.

Second vibration sensor 120 is a sensor for measuring background noise received by first vibration sensor 110. Second vibration sensor 120 is spaced apart from bearing 60 so as not to receive vibration of bearing 60. In order to detect background noise received by first vibration sensor 110 as accurately as possible by second vibration sensor 120, second vibration sensor 120 is preferably of the same type as first vibration sensor 110 and disposed in the vicinity of first vibration sensor 110. In the present first embodiment, second vibration sensor 120 is fixed to first vibration sensor 110 using fixing members 130, 132 such as cable ties. Second vibration sensor 120 then outputs a detection signal to data processor 80 through a signal line 122.

Figure 3:
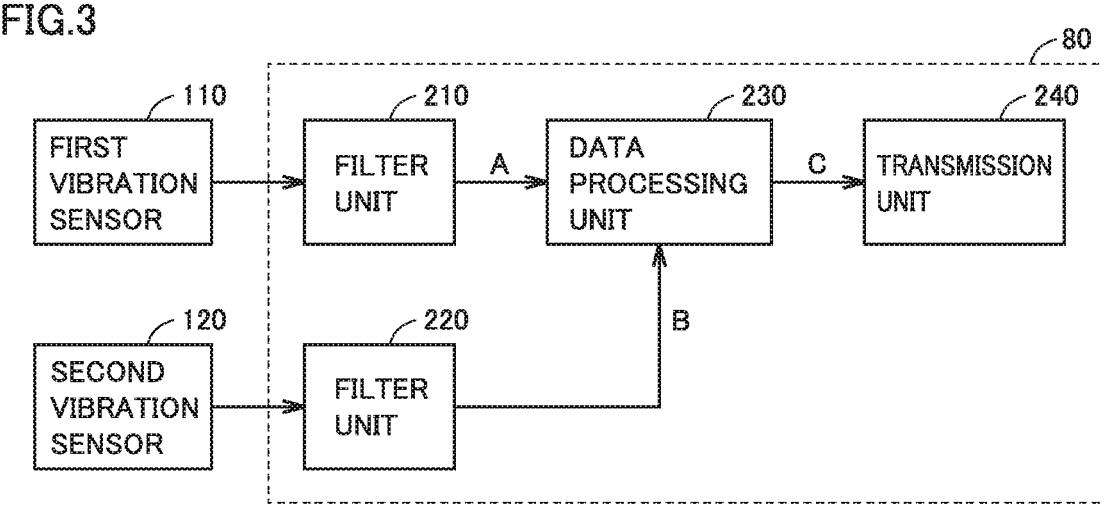
FIG. 3 is a functional block diagram showing the functional configuration of a data processor.

FIG. 3 is a functional block diagram showing the functional configuration of data processor 80. Referring to FIG. 3, data processor 80 includes filter units 210, 220, a data processing unit 230, and a transmission unit 240.

Filter unit 210 receives a detection signal of first vibration sensor 110, passes a component in a predetermined certain frequency band of the received detection signal, and attenuates components in other frequency bands. Filter unit 220 receives a detection signal of second vibration sensor 120, passes a component in a predetermined certain frequency band of the received detection signal, and attenuates components in other frequency bands. As an example, filter units 210, 220 include a high-pass filter that passes a signal component higher than a predetermined frequency and cuts off a low-frequency component. Although it is preferable to provide filter units 210, 220 having the noise-reducing effect, filter units 210, 220 are not essential elements in the present invention.

Data processing unit 230 receives an output signal (hereinafter referred to as "measurement signal A") of filter unit 210 and an output signal (hereinafter referred to as "measurement signal B") of filter unit 220. That is, measurement signal A is a measurement signal of first vibration sensor 110 detecting vibration of bearing 60, and measurement signal B is a measurement signal of second vibration sensor 120 measuring background noise. Data processing unit 230 then calculates vibration measurement data C for analyzing vibration of bearing 60 by subtracting measurement signal B from measurement signal A and outputs the calculated vibration measurement data C to transmission unit 240.

Transmission unit 240 transmits vibration measurement data C received from data processing unit 230 by radio to a server for condition analysis (not shown) on the ground. The server thus can analyze vibration of bearing 60 based on vibration measurement data C. Although not shown, analysis of vibration of bearing 60 based on vibration measurement data C may be performed in data processor 80.

Figure 4:
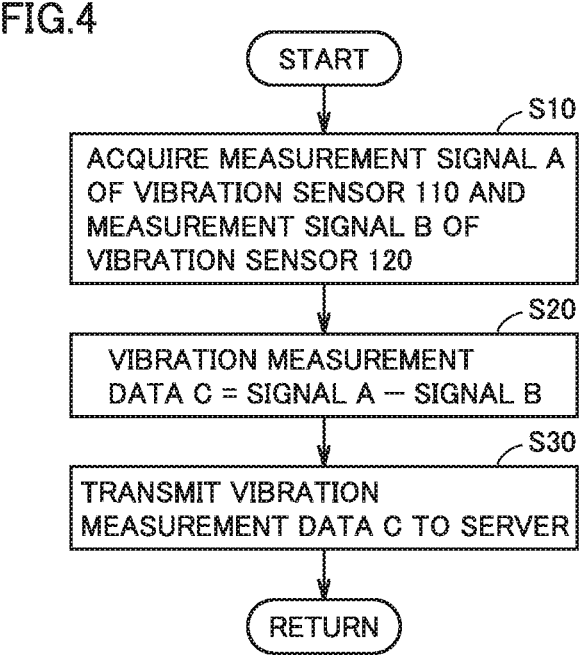
FIG. 4 is a flowchart illustrating the procedure of a process executed by the data processor.

FIG. 4 is a flowchart illustrating the procedure of a process executed by data processor 80. The process shown in this flowchart is invoked from the main routine and executed at predetermined intervals or when a predetermined condition is satisfied.

Referring to FIG. 4, data processor 80 acquires measurement signal A of first vibration sensor 110 and measurement signal B of second vibration sensor 120 (step S10). Subsequently, data processor 80 calculates vibration measurement data C by subtracting measurement signal B of second vibration sensor 120 from measurement signal A of first vibration sensor 110 (step S20). Vibration measurement data C is thus obtained which does not include background noise received by first vibration sensor 110 measuring vibration of bearing 60. Data processor 80 then transmits the calculated vibration measurement data C to an external server (server for vibration analysis) (step S30).

As described above, in the present first embodiment, second vibration sensor 120 is provided for measuring background noise received by first vibration sensor 110 measuring vibration of bearing 60. A signal obtained by subtracting measurement signal B of second vibration sensor 120 from measurement signal A of first vibration sensor 110 is then output as vibration measurement data C indicating vibration of hearing 60. Vibration measurement data that does not include background noise received by first vibration sensor 110 is thus obtained. Therefore, the present first embodiment provides vibration measurement data in which noise is sufficiently reduced.

Second Embodiment

The first embodiment can provide vibration measurement data that theoretically does not include background noise received by first vibration sensor 110. However, in actuality, it may be difficult to completely remove noise, for example, due to performance variation and installation condition of first vibration sensor 110 and second vibration sensor 120. In the present second embodiment, when background noise detected by second vibration sensor 120 is excessive, calculation and transmission to the server of vibration measurement data C is disabled.

The overall configuration of wind turbine 10 in the present second embodiment is the same as the first embodiment shown in FIG. 1.

Figure 5:
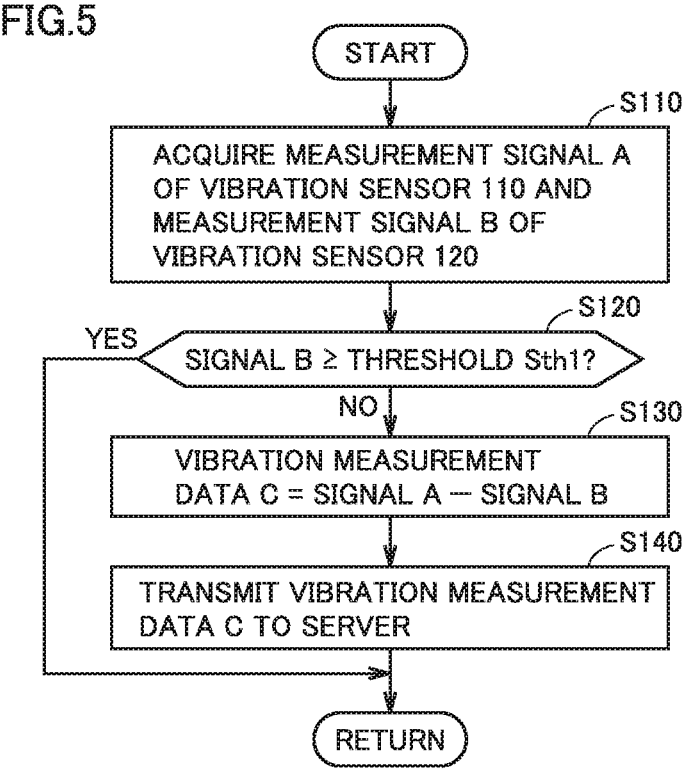
FIG. 5 is a flowchart illustrating the procedure of a process executed by the data processor in a second embodiment.

FIG. 5 is a flowchart illustrating the procedure of a process executed by data processor 80 in the second embodiment. The process shown in this flowchart is also invoked from the main routine and executed at predetermined time intervals or when a predetermined condition is satisfied.

Referring to FIG. 5, data processor 80 acquires measurement signal A of first vibration sensor 110 and measurement signal 13 of second vibration sensor 120 (step S110). Subsequently, data processor 80 determines whether measurement signal B is equal to or greater than a predetermined threshold Sth1 (step S120). This threshold Sth1 is a value for determining whether background noise is excessive, and is set as appropriate, for example, by acquiring and evaluating data in the apparatus in advance.

If it is determined that measurement signal B is smaller than threshold Sth1 at step S120 (NO at step S120), data processor 80 proceeds to step S130. Steps S130 and S140 are the same as steps S20 and S30 in the flowchart shown in FIG. 4 and a description thereof will not be repeated.

On the other hand, if it is determined that measurement signal B is equal to or greater than threshold Sth1 at step S120 (YES at step S120), data processor 80 does not perform steps S130 and S140, and the process returns. That is, in this case, it is determined that background noise is excessive, and calculation and transmission to the server of vibration measurement data C is not performed.

As described above, according to the present second embodiment, when background noise detected by second vibration sensor 120 is excessive, calculation and transmission to the server of vibration measurement data C is not performed, thereby enabling accurate vibration analysis using data with less affected by noise.

Third Embodiment

In a third embodiment, when background noise detected by second vibration sensor 120 is minute, measurement signal A by first vibration sensor 110 is used as it is as vibration measurement data C indicating vibration of hearing 60.

The overall configuration of wind turbine 10 in the present third embodiment is also the same as the first embodiment shown in FIG. 1.

Figure 6:
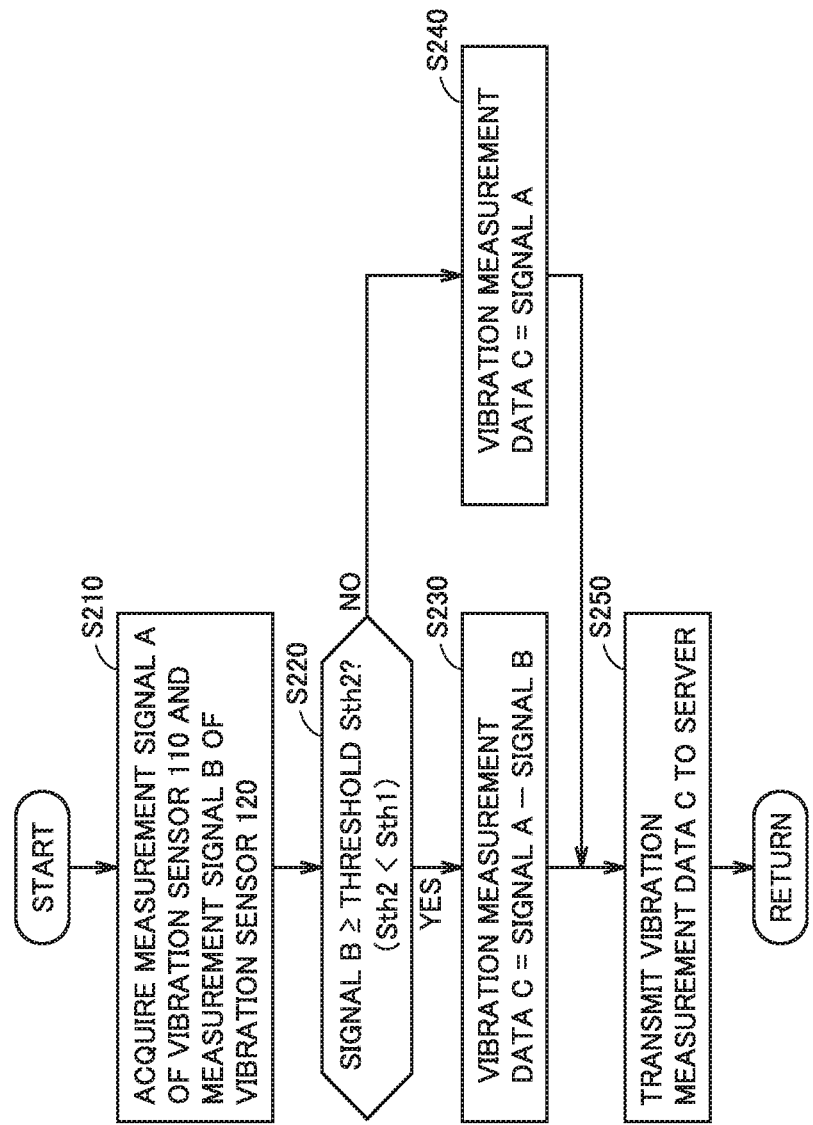
FIG. 6 is a flowchart illustrating the procedure of a process executed by the data processor in a third embodiment.

FIG. 6 is a flowchart illustrating the procedure of a process executed by data processor 80 in the third embodiment. The process shown in this flowchart is invoked form the main routine and executed at predetermined time intervals or when a predetermined condition is satisfied.

Referring to FIG. 6, data processor 80 acquires measurement signal A of first vibration sensor 110 and measurement signal B of second vibration sensor 120 (step S210). Subsequently, data processor 80 determines whether measurement signal B is equal to or greater than a predetermined threshold Sth2 (Sth2<Sth1) (step S220). This threshold Sth2 is a value for determining whether background noise is as small as negligible, and is set as appropriate, for example, by acquiring and evaluating data in the apparatus in advance.

If measurement signal B is equal to or greater than threshold Sth2 (YES at step S220), data processor 80 proceeds to step S230. Step S230 and subsequent step S250 are the same as steps S20 and S30, respectively, in the flowchart shown in FIG. 4 and a description thereof will not be repeated.

On the other hand, if it is determined that measurement signal B is smaller than threshold Sth2 at step S220 (NO at step S220), data processor 80 sets measurement signal A of first vibration sensor 110 as vibration measurement data C (step S240). That is, if background noise detected by second vibration sensor 120 is minute, measurement signal A by first vibration sensor 110 is used as it is as vibration measurement data C.

As described above, according to the present third embodiment, when background noise is minute, the process of subtracting measurement signal B of second vibration sensor 120 from measurement signal A of first vibration sensor 110 is not executed, thereby preventing unnecessary execution of the process.

Fourth Embodiment

The present fourth embodiment is a combination of the foregoing second and third embodiments. That is, in the present fourth embodiment, when background noise detected by second vibration sensor 120 is excessive, calculation and transmission to the server of vibration measurement data C is disabled. Then, when background noise is minute, measurement signal A by first vibration sensor 110 is used as it is as vibration measurement data C, and when background noise is neither minute nor excessive, a signal obtained by subtracting measurement signal B from measurement signal A is calculated as vibration measurement data C.

The overall configuration of wind turbine 10 in the present fourth embodiment is also the same as the first embodiment shown in FIG. 1.

Figure 7:
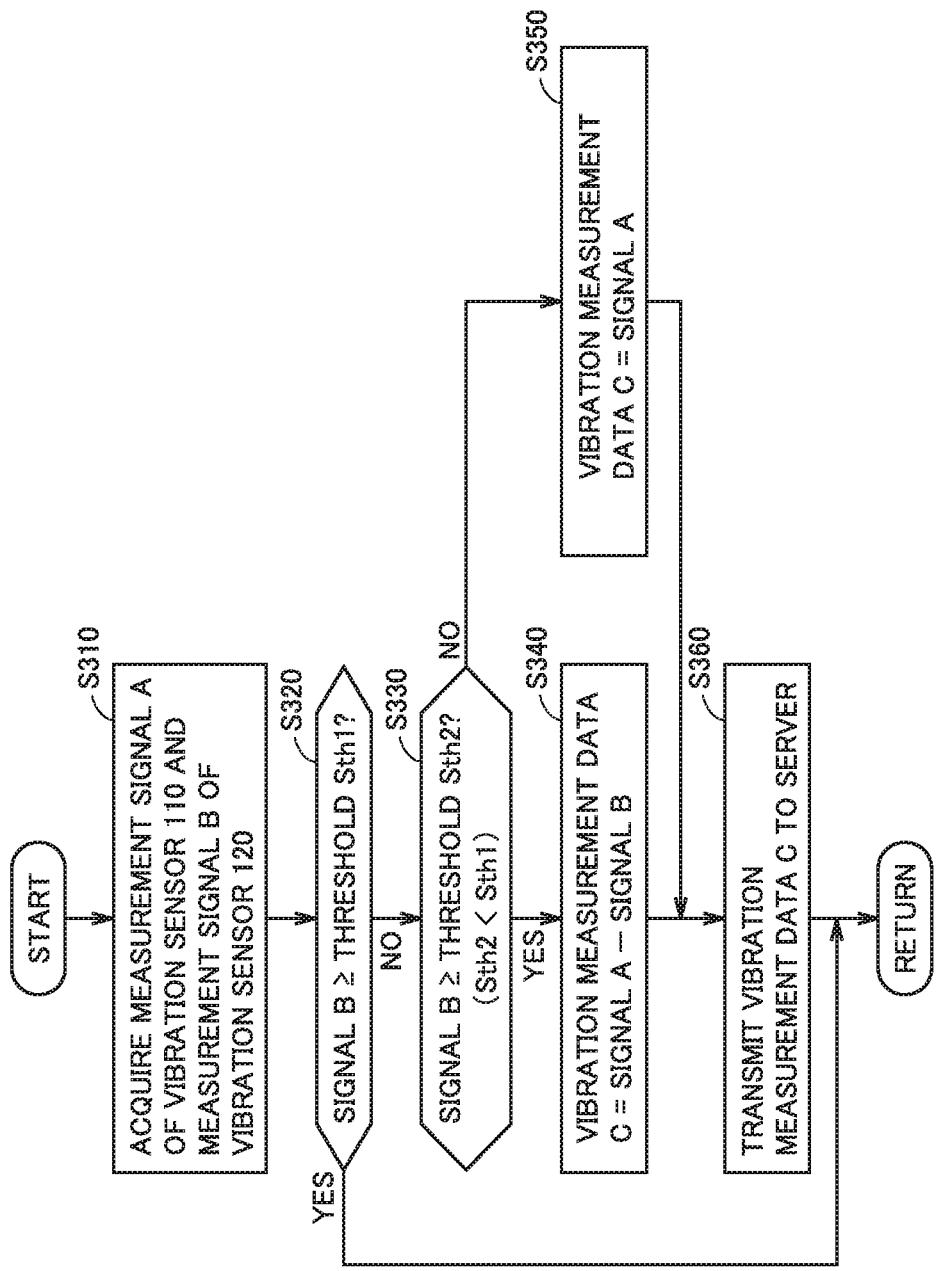
FIG. 7 is a flowchart illustrating the procedure of a process executed by the data processor in a fourth embodiment.

FIG. 7 is a flowchart illustrating the procedure of a process executed by data processor 80 in the fourth embodiment. The process shown in this flowchart is also invoked from the main routine and executed at predetermined time intervals or when a predetermined condition is satisfied.

Referring to FIG. 7, steps S310 and S330 to S360 are the same processing as steps S210 to S250 shown in FIG. 6, respectively. In this flowchart, when measurement signal A of first vibration sensor 110 and measurement signal B of second vibration sensor 120 are acquired at step S310, data processor 80 determines whether measurement signal B is equal to or greater than predetermined threshold Sth1 (step S320)

If it is determined that measurement signal B is equal to or greater than threshold Sth1 at step S320 (YES at step S320), data processor 80 does not perform the subsequent processing, and the process returns. That is, in this case, it is determined that background noise is excessive, and calculation and transmission to the server of vibration measurement data C is not performed.

On the other hand, if it is determined that measurement signal B is smaller than threshold Sth1 at step S320 (NO at step S320), data processor 80 proceeds to step S330. As previously mentioned, the processing subsequent to step S330 is the same as the processing subsequent to step S220 shown in FIG. 6 and a description thereof will not be repeated.

As described above, the present fourth embodiment achieves the same effects as in the second embodiment and the third embodiment.

Modification

In the foregoing embodiments, second vibration sensor 120 is spaced apart from bearing 60 so as not to receive vibration of bearing 60 from bearing 60 and is fixed to first vibration sensor 110 using fixing members 130, 132 such as cable ties (FIG. 2). However, the installation method for second vibration sensor 120 is not limited to such a manner. For example, second vibration sensor 120 may be installed at bearing 60 as a measurement target with a member interposed for absorbing vibration of bearing 60.

Figure 8:
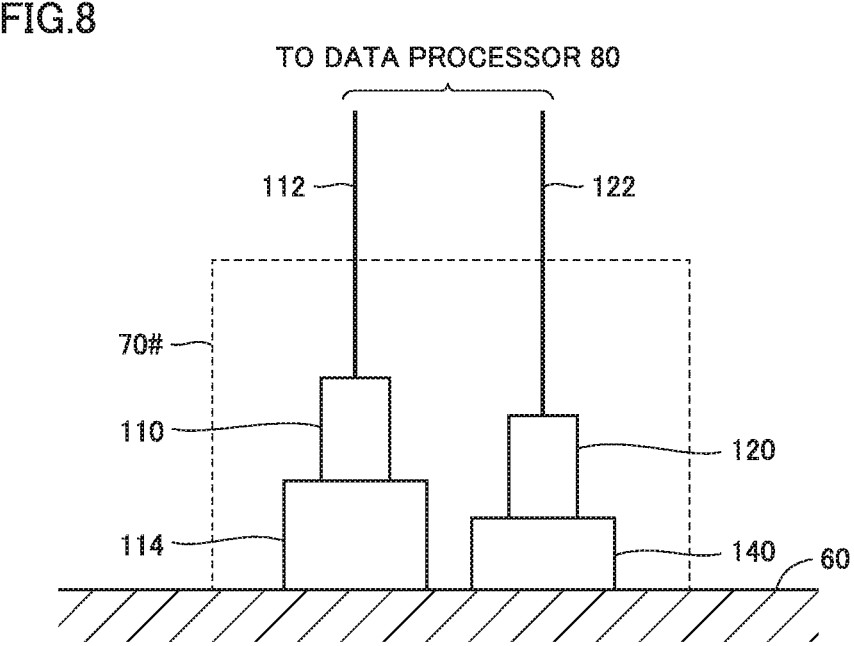
FIG. 8 is a diagram showing a configuration of a vibration detection unit in a modification.

FIG. 8 is a diagram showing a configuration of a vibration detection unit 70 # in this modification. Referring to FIG. 8, in vibration detection unit 70 #, second vibration sensor 120 for measuring background noise received by first vibration sensor 110 is installed at bearing 60 with a vibration absorbing member 140 interposed. Vibration absorbing member 140 is a member for absorbing vibration of bearing 60 and is configured with, for example, a rubber or elastomer member.

In the foregoing embodiments and modification, vibration of bearing 60 is measured in vibration detection unit 70. However, the mechanical component as a vibration measurement target is not limited to bearing 60 and may be gearbox 40 or generator 50 or may be a bearing other than bearing 60.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

10 wind turbine, 20 main shaft, 30 blade, 40 gearbox, 50 generator, 52 control board, 54 power transmission line, 60 bearing, 70, 70# vibration detection unit, 80 data processor, 90 nacelle, 100 tower, 110 first vibration sensor, 112, 122 signal line, 120 second vibration sensor, 114 metal base, 130, 132 fixing member, 140 vibration absorbing member, 210, 220 filter unit, 230 data processing unit, 240 transmission unit.

The invention claimed is:

1. A condition monitoring system that monitors a state of a wind turbine, the condition monitoring system comprising:
a first vibration sensor installed at a mechanical component in the wind turbine and configured to measure vibration of the mechanical component, the mechanical component being a source of noise;
a second vibration sensor installed in the wind turbine so as not to receive vibration of the mechanical component and configured to measure noise received by the first vibration sensor, the second vibration sensor being spaced apart from the mechanical component and being fixed to the first vibration sensor; and
a controller configured to include a first process of receiving first and second signals and outputting a third signal as data indicating vibration of the mechanical component, the first signal being a measurement signal of the first vibration sensor, the second signal being a measurement signal of the second vibration sensor, the third signal being obtained by subtracting the second signal from the first signal.

2. The condition monitoring system according to claim 1, wherein the controller is configured to:
disable the first process when a magnitude of the second signal is equal to or greater than a first predetermined value indicating that the noise is excessive; and
execute the first process when the magnitude of the second signal is smaller than the first predetermined value.

3. The condition monitoring system according to claim 1, wherein the controller further includes a second process of outputting the first signal as the data, and
wherein the controller is configured to:
execute the second process when a magnitude of the second signal is smaller than a second predetermined value indicating that the noise is minute; and
execute the first process when the magnitude of the second signal is equal to or greater than the second predetermined value.

4. The condition monitoring system according to claim 3, wherein the controller is configured to disable the first and second processes when the magnitude of the second signal is equal to or greater than a third predetermined value indicating that the noise is excessive.

5. A wind turbine comprising the condition monitoring system of claim 1.

6. A condition monitoring system that monitors a state of a wind turbine, the condition monitoring system comprising:
a first vibration sensor installed at a mechanical component in the wind turbine and configured to measure vibration of the mechanical component, the mechanical component being a source of noise;
a second vibration sensor installed in the wind turbine so as not to receive vibration of the mechanical component and configured to measure noise received by the first vibration sensor, the second vibration sensor being installed at the mechanical component with a vibration absorbing member interposed; and
a controller configured to include a first process of receiving first and second signals and outputting a third signal as data indicating vibration of the mechanical component, the first signal being a measurement signal of the first vibration sensor, the second signal being a measurement signal of the second vibration sensor, the third signal being obtained by subtracting the second signal from the first signal.

7. The condition monitoring system according to claim 6, wherein the controller is configured to:
disable the first process when a magnitude of the second signal is equal to or greater than a first predetermined value indicating that the noise is excessive; and
execute the first process when the magnitude of the second signal is smaller than the first predetermined value.

8. The condition monitoring system according to claim 6, wherein the controller further includes a second process of outputting the first signal as the data, and
wherein the controller is configured to:
execute the second process when a magnitude of the second signal is smaller than a second predetermined value indicating that the noise is minute; and
execute the first process when the magnitude of the second signal is equal to or greater than the second predetermined value.

9. The condition monitoring system according to claim 8, wherein the controller is configured to disable the first and second processes when the magnitude of the second signal is equal to or greater than a third predetermined value indicating that the noise is excessive.

10. A wind turbine comprising the condition monitoring system of claim 6.

* * * * *